(12) United States Patent
Vassilieva et al.

(10) Patent No.: US 8,977,137 B2
(45) Date of Patent: Mar. 10, 2015

(54) POLARIZATION DEPENDENT LOSS COMPENSATION

(75) Inventors: Olga Vassilieva, Plano, TX (US);
Inwoong Kim, Allen, TX (US);
Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 55 days.

(21) Appl. No.: 13/552,252

(22) Filed: Jul. 18, 2012

(65) Prior Publication Data

US 2014/0023362 A1    Jan. 23, 2014

(51) Int. Cl.
*H04B 10/06*        (2006.01)

(52) U.S. Cl.
USPC .......................................... 398/205; 398/206

(58) Field of Classification Search
CPC ........... H04B 10/0795; H04B 10/2572; H04B 10/532
USPC .................................................. 398/205, 206
See application file for complete search history.

(56) References Cited

U.S. PATENT DOCUMENTS

| | | | | |
|---|---|---|---|---|
| 5,311,346 | A * | 5/1994 | Haas et al. | 398/146 |
| 6,038,357 | A * | 3/2000 | Pan | 385/24 |
| 6,760,151 | B1 * | 7/2004 | Vail et al. | 359/341.3 |
| 7,039,325 | B2 * | 5/2006 | Sekiya et al. | 398/181 |
| 7,067,795 | B1 * | 6/2006 | Yan et al. | 250/225 |
| 7,206,517 | B1 * | 4/2007 | Yu et al. | 398/152 |
| 7,522,785 | B2 * | 4/2009 | Yao | 385/11 |
| 7,796,894 | B1 * | 9/2010 | Yao | 398/159 |
| 8,249,466 | B2 * | 8/2012 | Hoshida | 398/205 |
| 8,442,405 | B2 * | 5/2013 | Ellison et al. | 398/147 |
| 8,543,000 | B2 * | 9/2013 | Vassilieva et al. | 398/81 |
| 8,543,006 | B2 * | 9/2013 | Vassilieva et al. | 398/158 |
| 2003/0156776 | A1 * | 8/2003 | Han et al. | 385/11 |
| 2004/0004755 | A1 * | 1/2004 | Roberts et al. | 359/337 |
| 2004/0218919 | A1 * | 11/2004 | Hunsche et al. | 398/27 |
| 2004/0218933 | A1 * | 11/2004 | Fludger et al. | 398/205 |
| 2005/0002099 | A1 * | 1/2005 | He et al. | 359/494 |
| 2005/0226632 | A1 * | 10/2005 | Alleston et al. | 398/152 |
| 2008/0138070 | A1 * | 6/2008 | Yan et al. | 398/65 |
| 2009/0213453 | A1 * | 8/2009 | Yao | 359/301 |
| 2011/0129215 | A1 * | 6/2011 | Boroditsky et al. | 398/29 |
| 2011/0243557 | A1 * | 10/2011 | Croussore et al. | 398/45 |
| 2012/0063781 | A1 * | 3/2012 | Vassilieva et al. | 398/65 |
| 2012/0063783 | A1 * | 3/2012 | Vassilieva et al. | 398/81 |

(Continued)

OTHER PUBLICATIONS

Yan et al., "Demonstrations of In-line Monitoring and Compensation of polarization-dependent loss for multiple channels", IEEE Photon. Technol. Lett. vol. 14, No. 6 Jun. 2002, pp. 864-866.

Xie et al., "Performance Degradation Induced by Polarization-Dependent Loss in Optical Fiber Transmission Systems With and Without Polarization-Mode Dispersion", J. of Lightwave Technology, vol. 21, No. 9, Sep. 2003, pp. 1953-1957.

*Primary Examiner* — Ken Vanderpuye
*Assistant Examiner* — Amritbir Sandhu
(74) *Attorney, Agent, or Firm* — Maschoff Brennan (57) ABSTRACT

An apparatus including a polarization controller is described. The polarizer controller is communicatively coupled via a feedback loop to an evaluation module located near an optical receiver. The evaluation module is configured to measure polarization dependent loss (PDL) of an optical signal received at the optical receiver. The polarization controller is configured to receive feedback control data regarding the PDL from the evaluation module. Additionally, the polarization controller is configured to modify a state of polarization of the optical signal at an optical transmitter, which is communicatively coupled to the optical receiver, based on the feedback control data.

17 Claims, 5 Drawing Sheets

(56) References Cited

U.S. PATENT DOCUMENTS

2012/0170929 A1* 7/2012 Xie et al. .................. 398/33
2013/0064493 A1* 3/2013 Minneman et al. ............. 385/11
2013/0275109 A1* 10/2013 Vassilieva et al. .............. 703/13

* cited by examiner

POLARIZATION DEPENDENT LOSS COMPENSATION

FIELD

The embodiments discussed herein are related to reducing polarization dependent loss (PDL) in optical networks.

BACKGROUND

Optical networks may be used to communicate information. In some optical networks, information is communicated in the form of optical signals through optical fibers. The optical signals may include dual polarization optical signals in which different data is encoded on orthogonally polarized components, e.g., an x component and a y component.

The optical networks may include network elements such as amplifiers, dispersion compensators, multiplexer filters, etc. configured to perform various operations within the optical network. Each of these network elements may introduce polarization dependent effects on the optical signals traveling through the optical network.

The polarization dependent effects may cause one of the polarization components of a dual polarization optical signal to experience some power loss, which is referred to as polarization dependent loss (PDL), while the orthogonally polarized component may experience power gain. Unequal power levels of the polarization components may cause information encoded thereon to become distorted or lost.

Additionally, PDL may introduce crosstalk, which may be manifested in nonlinear effects such as nonlinear phase noise. The nonlinear effects may increase an optical signal to noise ratio (OSNR) penalty of the optical signal, which may result in an inability to read the information modulated thereon. The presence of PDL and/or nonlinear effects may be visible in optical waveforms of the optical signal as optical peak power variations.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, an apparatus including a polarization controller is described. The polarizer controller is communicatively coupled via a feedback loop to an evaluation module located near an optical receiver. The evaluation module is configured to measure polarization dependent loss (PDL) of an optical signal received at the optical receiver. The polarization controller is configured to receive feedback control data regarding the PDL from the evaluation module. Additionally, the polarization controller is configured to modify a state of polarization of the optical signal at an optical transmitter, which is communicatively coupled to the optical receiver, based on the feedback control data.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present invention will be explained with reference to the accompanying drawings.

Figure 1:
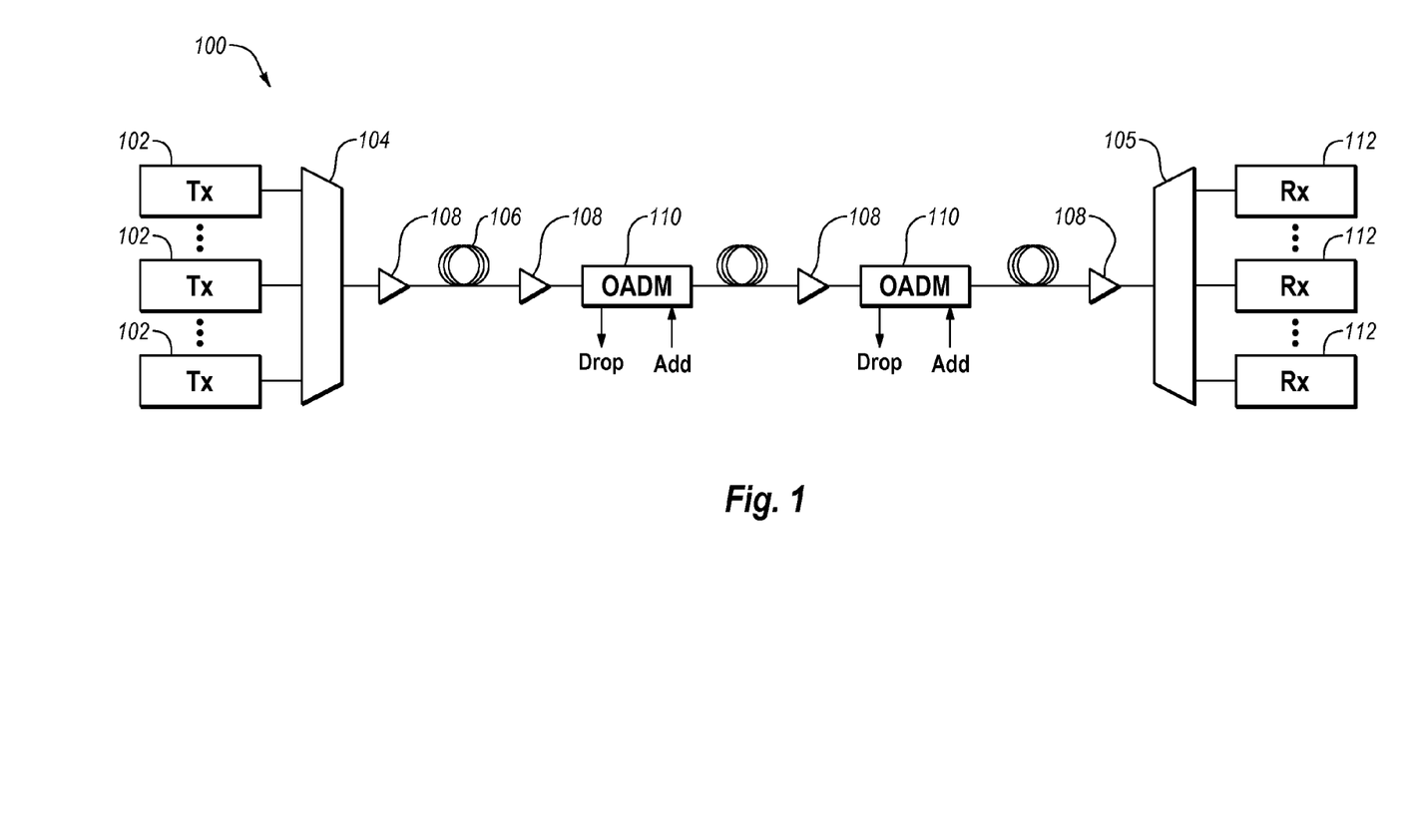
FIG. 1 is a block diagram of an example optical network in which some embodiments described herein may be implemented.

FIG. 1 is a block diagram of an example optical network 100 in which some embodiments described herein may be implemented. Generally, the optical network 100 communicates optical signals between network elements 102, 104, 105, 108, 110, and 112 included therein. The optical network 100 may include a point-to-point optical network with terminal nodes, a ring optical network, a mesh optical network, any other suitable optical network, or a combination of two or more optical networks.

Specifically, in the optical network 100, the network elements 102, 104, 105, 108, 110, and 112 may include one or more optical transmitters (Tx in FIG. 1) 102 (hereinafter transmitters 102), one or more multiplexers (hereinafter MUX) 104, one or more demultiplexers (hereinafter DEMUX) 105, one or more amplifiers 108, one or more optical add/drop multiplexers (hereinafter OADMs) 110, and one or more optical receivers (Rx in FIG. 1) 112 (hereinafter receivers 112).

Between the network elements 102, 104, 105, 108, 110, and 112, the optical network 100 may include one or more optical fibers 106. The optical fibers 106 link the network elements 102, 104, 105, 108, 110, and 112 and act as a waveguide for optical signals communicated in the optical network 100. Generally, each of the optical fibers 106 may include a core surrounded by a cladding layer. The optical fibers 106 may include any suitable type of fiber including but not limited to, a single-mode fiber, a multi-mode fiber, or an enhanced large effective area fiber.

In some embodiments, different optical signals communicated over the optical network 100 may be assigned to different nominal optical frequencies (or wavelengths), also referred to as channels. For example, one channel may be at a first frequency, with other channels being at other wavelengths spaced apart from each other at a nominal channel spacing, such as 100 gigahertz (GHz), 50 GHz, 25 GHz, or at some other channel spacing. Using different channels for different optical signals generally allows multiple optical signals to be simultaneously communicated over the same optical fiber 106 without the optical signals interfering with each other.

The optical signals communicated in the optical network 100 may be modulated to encode information. Types of modulation may include phase modulation, frequency modulation, polarization modulation, amplitude modulation, and combinations thereof. The modulation generally alters a characteristic of the optical signal to encode the information on the optical signal. For example, phase modulation may alter the phase of the optical signal by passing the optical signal through a crystal. A specific phase or a specific alteration to the phase of the optical signal communicates a specific piece of information. A specific modulation scheme involving phase modulation that may be implemented by some embodiments described herein includes dual-polarization quadrature phase shift keying (DP-QPSK).

DP-QPSK modulation is an example of polarization division multiplexing (PDM). PDM generates a dual polarization optical signal through modulating information onto various polarization components of the optical signal associated with a channel. As used herein, the polarization of the optical signal refers to the direction of the oscillations of the optical signal. Generally, an arbitrary linearly polarized optical signal may be resolved into two independent orthogonal components, which may include an x polarization component and a y polarization component. The x polarization component and the y polarization component may be in phase. In PDM, information is encoded on both the x polarization component and the y polarization component. The orthogonal polarizations of the x and y polarization components generally limit and/or eliminate cross-talk between the two components. Thus, by encoding information in both an x-polarization component of the optical signal and the y-polarization component of the optical signal, the bit rate of the resulting optical signal may be relatively higher than in the absence of PDM.

Additionally, to increase the amount of information communicated in the optical network 100, multiple optical signals may be transmitted using multiple channels. The multiple channels may be combined into a multi-channel optical signal, which is communicated along a single optical fiber 106. The process of communicating information at multiple channels combined into the multi-channel optical signal is referred to as wavelength division multiplexing (WDM). As used herein, the term multi-channel WDM optical signal may be used to describe an optical signal including multiple channels. Use of WDM in the optical network 100 may increase the aggregate bandwidth per optical fiber 106. With relatively greater bandwidth, the optical network 100 may be capable of transmitting relatively greater amounts of information. Additionally, in the optical network 100 utilizing WDM, each channel may be modulated according to one or more of the types of modulation discussed above.

With continued reference to FIG. 1, the transmitters 102 may be configured to transmit the optical signals through the optical network 100. Each of the transmitters 102 may transmit an optical signal of a specific channel. Moreover, each of the transmitters 102 may be configured to generate and transmit DP-QPSK optical signals, or optical signals generated according to some other suitable modulation scheme.

Each of the transmitters 102 may generally include any system, apparatus, or device configured to convert one or more electrical signals into an optical signal and to transmit the optical signal. For example, each of the transmitters 102 may include an optical source, such as a laser, and a modulator. The optical source may be configured to generate the optical signal. The modulator may be configured to receive the electrical signals and modulate the information represented by the electrical signals onto the optical signal. The optical signal may then be transmitted from the modulator through the optical network 100. While the transmitters 102 have generally been described as implementing externally modulated optical sources, in other embodiments, the transmitters may implement directly modulated optical sources.

The MUX 104 may be coupled to the transmitters 102. The MUX 104 may be configured to combine the optical signals of the specific channels transmitted by transmitters 102 into a single optical signal. That is, the MUX 104 performs WDM creating a multi-channel WDM optical signal from the multiple individual channels transmitted by the transmitters 102, and outputs the multi-channel WDM optical signal onto a corresponding optical fiber 106.

The amplifiers 108 may be positioned throughout the optical network 100 to amplify the multi-channel WDM optical signal. Some examples of the amplifiers may include, but are not limited, to optical repeaters, which may additionally perform opto-electrical or electro-optical conversion; optical fibers doped with a rare-earth element, which excite atoms of the rare-earth element to increase the intensity of the optical signal; erbium-doped fiber amplifiers (EDFA); semiconductor optical amplifier (SOA); or any other suitable amplifier.

The OADMs 110 may include any system, apparatus, or device configured to add and/or drop optical signals from optical fiber 106. For example, each of the OADMs 110 may be configured to add an optical signal of a specific channel to the multi-channel WDM optical signal, and/or to remove (e.g., drop) an optical signal of a specific channel from the multi-channel WDM optical signal. After passing through an OADM 110, an optical signal may travel along the optical fiber 106 directly to a destination, or the optical signal may be passed through one or more additional OADMs 110 before reaching a destination.

The DEMUX 105 may be included at one or more destinations of the optical network 100. The DEMUX 105 may be configured to demultiplex or split the multi-channel WDM optical signal into the individual channels included therein. In some embodiments, the DEMUX 105 may be similar to the MUX 104 but configured to split the optical signal into individual channels instead of combine individual channels into one multi-channel WDM optical signal.

The optical network 100 may include the receivers 112 coupled to the DEMUX 105. Each of the receivers 112 may be configured to receive a corresponding one of the optical signals output by the DEMUX 105, and process the optical signal for the information contain thereon. Accordingly, the optical network 100 may include at least one receiver 112 for every channel of the optical single communicated in the optical network 100.

Modifications, additions, or omissions may be made to the optical network 100 without limitation. For example, the optical network 100 may include some subset of the network elements 102, 104, 105, 108, 110, and 112. Additionally or alternatively, the optical network 100 may include additional network elements other than those depicted and/or discussed herein.

Figure 2:
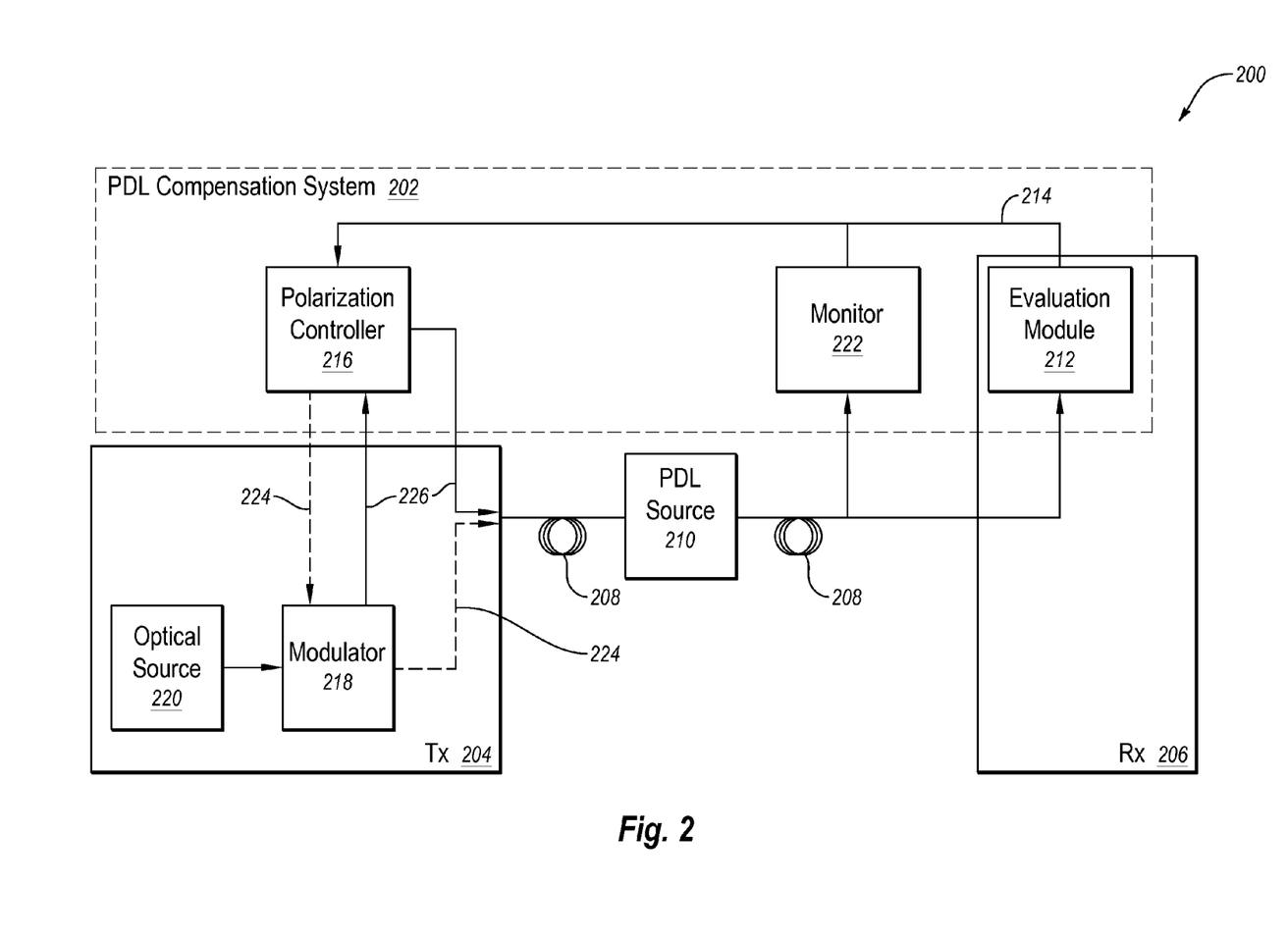
FIG. 2 is a block diagram of an example polarization dependent loss compensation system that may be implemented in the optical network of FIG. 1.

FIG. 2 is a block diagram of an example polarization dependent loss (PDL) compensation system 202 that may be implemented in the optical network 100 of FIG. 1. Generally, the PDL compensation system 202 is configured to measure or otherwise assess the PDL of an optical signal at an optical receiver 206 (hereinafter receiver 206). The PDL may be introduced to the optical signal by a PDL source 210. A polarization controller 216 may be configured to rotate a state of polarization (hereinafter SOP) of the optical signal at an optical transmitter 204 (hereinafter transmitter 204). Rotating the SOP of the optical signal may compensate for the PDL introduced to the optical signal by the PDL source 210.

The PDL compensation system 202 is depicted in the context of the optical network 200 that may be similar to the optical network 100 of FIG. 1. For example, the transmitter 204 may correspond to any of the transmitters 102 of FIG. 1, and the receiver 206 may correspond to any of the receivers 112 of FIG. 1. Generally, the transmitter 204 generates the optical signal that is communicated through one or more optical fibers 208 to the receiver 206. The optical fiber 208 may be configured to communicate the optical signal from the transmitter 204 to the receiver 206.

Between the transmitter 204 and the receiver 206, the optical network 200 may include the PDL source 210. The PDL source 210 includes any network element or network device that introduces PDL into the optical network 200, such as the MUX 104, the DEMUX 105, the amplifiers 108, and/or the OADMs 110 of FIG. 1. That is, as the optical signal travels through the optical network 200, the optical signal passes through the PDL source 210. Due to spatial polarization interaction, the PDL source 210 may reduce the power of the optical signal in selective directions.

For example, in embodiments in which the optical signal is a dual polarization optical signal, a modulated x polarization component and a modulated y polarization component of a channel may be affected in different ways. The PDL source 210 may attenuate the modulated x polarization component of the dual polarization optical signal, for instance. PDL may therefore lead to poor signal quality and/or data loss. Additionally, the PDL source 210 may attenuate the various channels of a multi-channel WDM optical signal differently. Accordingly, in a multi-channel WDM signal, each modulated polarization component of each channel may experience varying degrees of PDL while traveling through the optical network 200.

The PDL compensation system 202 may include an evaluation module 212. Generally, the evaluation module 212 includes a system or an apparatus configured to, at least partially, measure the PDL of the optical signal. In some embodiments, the evaluation module 212 is configured to at least partially measure the PDL of the optical signal by measuring signal quality of the optical signal received at the receiver 206. The signal quality may include a measure of an actual bit error rate (BER) of the optical signal, for instance. For example, an expected BER may be calculated for the optical network 200 and/or an optical path (not shown) in the optical network 200. The evaluation module 212 may measure the actual BER of the optical signal. If the actual BER of the optical signal is greater than the expected BER, the optical signal may include PDL.

Alternatively, the evaluation module 212 may measure the actual BER and then covert the actual BER to a Q-factor. Generally, the SOP of the optical signal may be random. Thus, the Q-factor of the optical signal may vary. A Q-factor threshold may be set establishing a criterion below which the optical signal may be deemed to include PDL. If the evaluation module 212 determines the optical signal includes PDL, the evaluation module 212 may generate and/or communicate a signal that the SOP of the optical signal may be rotated.

For example, the Q-factor threshold may be 8.3 decibels (dB). If the evaluation module 212 measures a Q-factor below 8.3 dB, the evaluation module 212 may communicate a signal to rotate the SOP of the optical signal by a given angle. By rotating the SOP, the Q-factor may be increased above the Q-factor threshold. More generally, the evaluation module 212 may communicate to the polarization controller 216 feedback control data indicating that the SOP of the optical signal should be rotated. The feedback control data may include the measured Q-factor, an angle rotation that may be applied to the SOP of the optical signal, a control signal to cause the polarization controller 216 to apply the angle rotation to the SOP, or the like or any combination thereof.

The evaluation module 212 is depicted as a component included in the receiver 206 in FIG. 2. This depiction is not meant to be limiting. Generally, however, the evaluation module 212 is configured to measure signal quality and/or PDL of the optical signal received at the receiver 206 or at least following the PDL source 210 included in the optical network 200.

As previously suggested, the signal generated by the evaluation module 212 regarding the signal quality, the measurement of PDL, or a control signal to rotate the SOP may be referred to as feedback control data. The evaluation module 212 may communicate the feedback control data to the polarization controller 216 or may communicate the feedback control data to an alternate, intermediary system that communicates the feedback control data to the polarization controller 216. In some embodiments, the evaluation module 212 may be coupled to a feedback loop 214, which is also configured to, at least partially, communicate feedback control data from the evaluation module 212 to the polarization controller 216. The feedback loop 214 may be located within the optical fibers 208. For example, the feedback loop 214 may include a supervisory signal that is communicated along the optical fiber 208.

The feedback loop 214 may be communicative coupled to the polarization controller 216. The polarization controller 216 may be configured to modify a SOP of the optical signal at the transmitter 204. Generally, the polarization controller 216 may modify the SOP of the optical signal by interfacing in some way with a modulator 218 included in the transmitter 204.

In some embodiments, in the transmitter 204 an optical source 220 is configured to generate an unmodulated or continuous wave (CW) optical signal. The modulator 218 is coupled to the optical source 220 and configured to modulate the CW optical signal based at least partially on ordinary polarization data. As used herein, the ordinary polarization data refers to electrical signals, that when transmitted to the modulator 218, encode polarization information onto the CW optical signal. The ordinary polarization data further refers to the electrical in the absence of information concerning the signal quality of the dual-polarization optical signal 319 (discussed below). In these and other embodiments, the polarization controller 216 may operate in the electrical domain to modify the SOP of the optical signal by altering an electric field of the modulator 218. In an example embodiment, the polarization controller 216 alters the electric field of the modulator 218 by modifying the ordinary polarization data upon which the optical signal is modulated. In FIG. 2, the polarization controller 216 modifying the ordinary polarization data is represented by a dotted line 224.

Alternatively, the polarization controller 216 may operate in the optical domain to modify the SOP of the optical signal by receiving the optical signal after the optical signal is modulated by the modulator 218. In an example embodiment, the polarization controller 216 receives the optical signal transmitted by the transmitter 204 and modifies the SOP of the optical signal in the optical domain. After the SOP is modified by the polarization controller 216, the optical signal is communicated to the optical fiber 208. In FIG. 2, the polarization controller 216 receiving the optical signal from the modulator 218 and communicating the optical signal to the optical fiber 208 is represented by arrows 226.

Additionally, in some embodiments the PDL compensation system 202 may include a monitor 222. The monitor 222 may be configured to confirm the presence of PDL in the optical signal. For example, the monitor 222 may measure an actual optical signal-to-noise ratio (OSNR) of the optical signal so that the PDL compensation system 202 can distinguish between signal quality issues caused by PDL versus OSNR.

Additionally or alternatively, the monitor 222 may interface with the evaluation module 212 and/or the feedback loop 214. In these and other embodiments, the monitor 222 may be utilized when the evaluation module 212 measures a potential presence of PDL in the optical signal. For instance, when the evaluation module 212 measures the actual BER as greater than the expected BER, the monitor 222 may measure the actual OSNR. Alternatively, when the Q-factor of the optical signal is below the Q-factor threshold the monitor 222 may measure the actual OSNR. That is, when the actual BER is greater than the expected BER or the measured Q-factor is below the Q-factor threshold the optical signal may be characterized as having a poor signal quality. The poor signal quality may be caused by a low OSNR and/or PDL. The monitor 222 may thus measure the actual OSNR to confirm that the poor signal quality is at least partially due to the PDL before the polarization controller 216 modifies the SOP of the optical signal.

Additionally, in the PDL compensation system 202, an acceptable OSNR may be calculated for the optical network 200 or an optical path included therein. When the actual OSNR measured by the monitor 222 is below the acceptable OSNR, the monitor 222 may additionally measure differences in insertion loss of amplified spontaneous emission noise to confirm that the poor signal quality is due to PDL.

The monitor 222 may be positioned such that the monitor 222 measures the optical signal between the PDL source 210 and the evaluation module 212, directly prior to the optical signal entering the evaluation module 212, or in parallel with the evaluation module 212. Alternatively, the monitor 222 or multiple monitors 222 may be positioned throughout the optical network 200 at any of various locations.

As depicted in FIG. 2, the optical network 200 includes one PDL compensation system 202. However, in some embodiments the optical signal may be a first channel of a multi-channel WDM signal. The multi-channel WDM signal may additionally include multiple other channels. In these and other embodiments, the optical network 200 may include multiple PDL compensation systems 202. Each of the PDL compensation systems 202 may include an evaluation module, a feedback loop, a polarization controller, or some combination thereof.

For example, if the multi-channel WDM signal included a second channel, the optical network 200 may include a second receiver including a second evaluation module. The second evaluation module may be configured to evaluate a signal quality of the second channel at the second receiver. The second evaluation module may additionally communicate second channel feedback control data related to the signal quality of the second channel to a second polarization controller and/or a second transmitter. The optical network 200 may also include a second transmitter. The second transmitter may include a second optical source configured to generate the second channel. The second transmitter may also include a second modulator coupled to the second optical source and configured to modulate the second channel based on polarization data. The optical network 200 may also include the second polarization controller configured to modify a second SOP of the second channel.

Figure 3A:
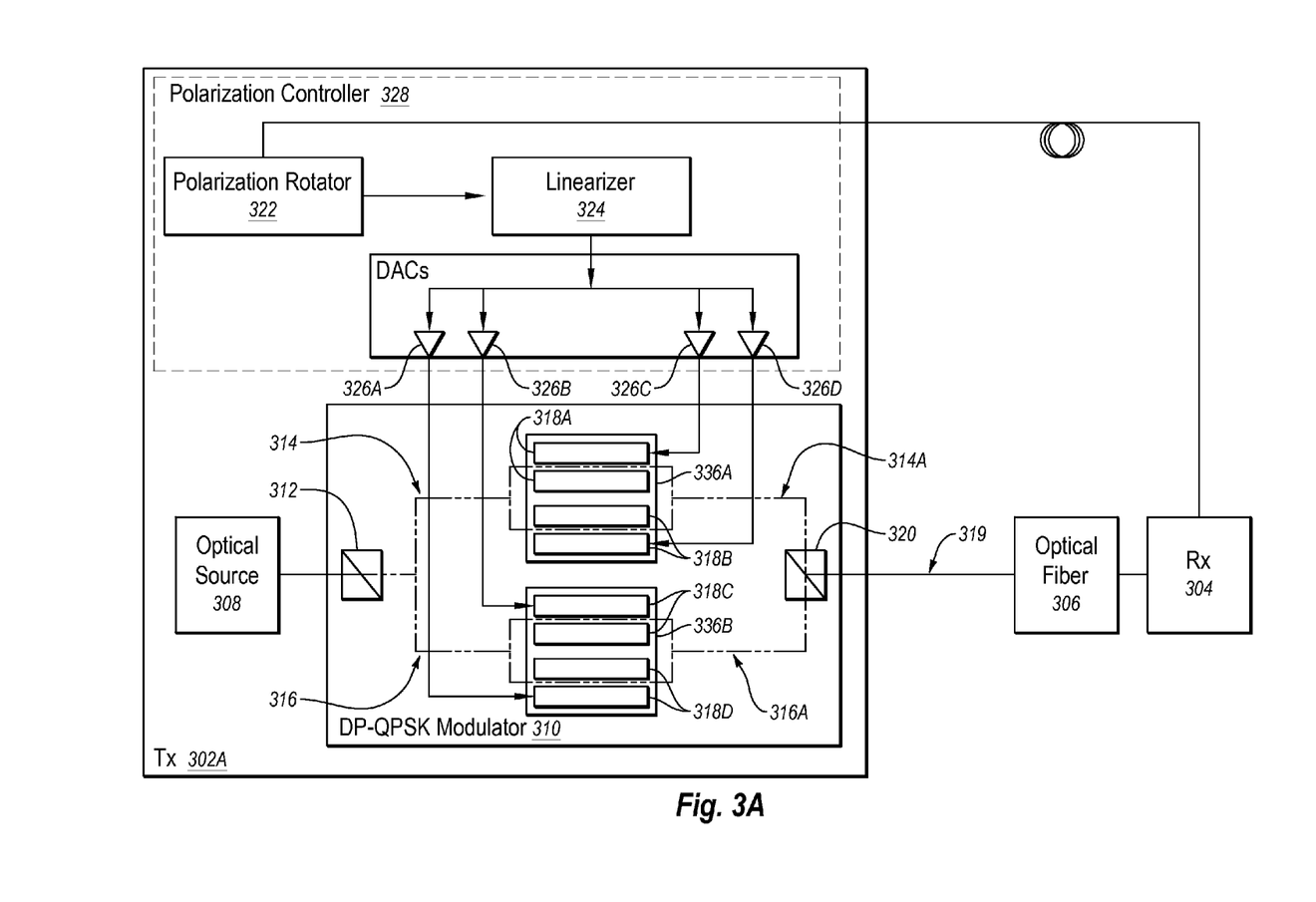
FIG. 3A is a block diagram of an example optical transmitter that may be implemented in the optical network of FIG. 1.

FIG. 3A is a block diagram of an example optical transmitter 302A (hereinafter transmitter 302A) that may be implemented in the optical network 100 of FIG. 1. The transmitter 302A is configured to generate a dual polarization optical signal, such as a DP-QPSK signal, that is transmitted through an optical fiber 306 to a receiver 304. A SOP of each polarization component of the dual polarization optical signal may be rotated in the transmitter 302A by a polarization controller 328 based on feedback control data received from the receiver 304. Generally, the polarization controller 328 is configured to operate in the electrical domain and is an example embodiment of the polarization controller 216 of FIG. 2. The polarization controller 328 may alter an electrical field of one or more in-phase and quadrature-phase (I-Q) modulators 336A and 336B which may be included in a DP-QPSK modulator 310. The DP-QPSK modulator 310 including the I-Q modulators 336A and 336B, may be configured to modulate each polarization component of the dual polarization optical signal. By altering the electrical field of the I-Q modulators 336A and/or 336B, the SOP of each polarization component of the dual polarization optical signal may be rotated.

In this and other embodiments, the I-Q modulators 336A and 336B may be included in a DP-QPSK modulator 310. However, this is not meant to be limiting. In alternative embodiments, one or more of the I-Q modulators 336A and/or 336B may independently modulate an optical signal or may be included in another type of modulator.

The transmitter 302A includes an optical source 308. The optical source 308 may be configured to generate a CW optical signal. An example of the optical source 308 may include a laser diode, a Fabry-Perot (FP) laser, a distributed feedback (DFB) laser, or the like. The optical source 308 may be pumped or otherwise stimulated to output the CW optical signal to the DP-QPSK modulator 310.

Within the DP-QPSK modulator 310, the CW optical signal may be divided by a polarization beam splitter 312 according to an x-polarization component 314 of the CW optical signal and a y-polarization component 316 of the CW optical signal. Following splitting of the beam into the x and y polarization components 314 and 316, information may be modulated onto the x and y polarization components 314 and 316.

Specifically, an x-I modulator 318A may modulate information on the in-phase of the x polarization component 314, an x-Q modulator 318B may modulate information on the quadrature phase of the x polarization component 314, a y-I modulator 318C may modulate information on the in-phase of the y polarization component 316, and a y-Q modulator 318D may modulate information on the quadrature phase of the y polarization component 316. Resulting modulated x and y polarization components 314A and 316A may be combined by a polarization beam combiner 320 into a dual polarization optical signal 319 output onto the optical fiber 306. Accordingly, by modulating information onto both the y-polarization component 316 and the x-polarization component 314, the amount of information that may be carried by the channel associated with the dual polarization optical signal 319 over any given time may be relatively greater, and in some cases about two times greater, than the amount of information that may be carried by an otherwise similar non-dual-polarization optical signal. In some embodiments, the dual-polarization optical signal 319 may be used in optical networks operating at bit rates of 40 gigabits per second (Gb/s), 100 Gb/s, 400 Gb/s, 1 terabit per second (Tb/s) or other bit rates.

In the discussion that follows, the x-I modulator 318A, the x-Q modulator 318B, the y-I modulator 318C, and the y-Q modulator 318D may generally be referred to singly and/or in combination as "phase modulator 318" or "phase modulators 318".

The modulation of information onto the optical signal may occur according to an electrical field that corresponds to ordinary polarization data. The ordinary polarization data may be described by the following example equations:

$$E_X = E_{XI} + iE_{XQ};$$

$$E_Y = E_{YI} + iE_{YQ};$$

and $$\begin{bmatrix} E_x \\ E_y \end{bmatrix}$$

In the foregoing equations, $E_X$ represents ordinary polarization data for the x polarization component 314 in the electrical domain. That is, $E_X$ represents a signal modulated to the x polarization component 314 to encode information thereon. Accordingly, $E_{XI}$ and $E_{XQ}$ represent the in-phase and quadrature phases of $E_X$, respectively. $E_{XI}$ may be provided to the x-I modulator 318A and $E_{XQ}$ may be provided to the x-Q modulator 318B. Likewise, $E_Y$ represents ordinary polarization data for the y polarization component 316 in the electrical domain. That is, $E_Y$ represents a signal modulated to the y polarization component 316 to encode information thereon. Accordingly, $E_{YI}$ and $E_{YQ}$ represent the in-phase and quadrature phases of $E_Y$, respectively. $E_{YI}$ may be communicated to the y-I modulator 318C and $E_{YQ}$ may be communicated to the y-Q modulator 318D. As used herein, $E_X$ and $E_Y$ make up the ordinary polarization data. The ordinary polarization data may be provided to a polarization rotator 322 included in the polarization controller 328 from a control system (not shown), for instance.

The polarization rotator 322 is configured to generate modified polarization data from feedback control data and the ordinary polarization data. The modified polarization data may affect the electrical field of the DP-QPSK modulator 310 causing the SOP of the optical signal to rotate. The feedback control data may be communicated from the receiver 304, an evaluation module (not shown) such as the evaluation module 212 of FIG. 2, a monitor (not shown) such as the monitor 222 of FIG. 2, or some combination thereof.

The feedback control data may include some or all of the following information. In some embodiments, the feedback control data includes one or more rotational angles by which the SOP may be rotated to improve performance. In particular, the rotational angles may be calculated to improve the signal quality of the dual-polarization optical signal 319. For example, the rotational angles may minimize an actual BER and/or increase the Q-factor of the dual-polarization optical signal 319.

Additionally or alternatively, the feedback control data may include a polarization rotation matrix based upon the rotational angles. By multiplying the ordinary polarization data by a polarization rotation matrix, the electrical domain of the I-Q modulators 336A and 336B included in the DP-QPSK modulator 310 may be altered to rotate the SOP of the optical signal.

An example embodiment of the polarization rotation matrix is provided below:

$$R(\theta, \psi) = \begin{bmatrix} \cos\left(\frac{\theta}{2}\right) + i\sin\left(\frac{\theta}{2}\right)\cos(2\psi) & i\sin\left(\frac{\theta}{2}\right)\sin(2\psi) \\ i\sin\left(\frac{\theta}{2}\right)\sin(2\psi) & \cos\left(\frac{\theta}{2}\right) - i\sin\left(\frac{\theta}{2}\right)\cos(2\psi) \end{bmatrix}$$

In the example polarization rotation matrix, $\theta$ and $\psi$ represent rotation angles. $R(\theta,\psi)$ represents the polarization rotation matrix of $\theta$ and $\psi$. To generate an intermediate modified polarization data, the polarization rotation matrix may be multiplied by the ordinary polarization matrix according to the following equation:

$$\begin{bmatrix} E''_X \\ E''_Y \end{bmatrix} = R(\theta, \psi) \begin{bmatrix} E_X \\ E_Y \end{bmatrix}$$

In the preceding equation, the ordinary polarization data and the polarization rotation matrix are represented as matrices. Additionally, in the equation, $E''_X$ represents intermediate modified polarization data for the x polarization component 314 and $E''_Y$ represents intermediate modified polarization data for the y polarization component 316. Collectively, $E''_X$ and $E''_Y$ are referred to as the intermediate polarization data.

In some embodiments, the polarization rotator 322 may communicate the intermediate polarization data to a linearizer 324. The linearizer 324 may be configured to linearize the intermediate polarization data to generate modified polarization data. For example, if information modulated by the DP-QPSK modulator 310 does not vary linearly, the linearizer 324 may be included to linearize intermediate polarization data. Alternatively, the intermediate polarization data may be communicated to the phase modulators 318A-318D or to digital-to-analog converters 326A-326D (generally, the DAC 326 or the DACs 326) discussed below. In some embodiments, the intermediate polarization data is linearized according to the following equations:

$$E'_X = \frac{2}{\pi}\sin^{-1}(E''_X)$$

and $$E'_Y = \frac{2}{\pi}\sin^{-1}(E''_Y)$$

In the equations, $E'_X$ represents modified polarization data for the x polarization component 314 and $E'_Y$ represents the modified polarization data for the y polarization component 316. Collectively, $E'_X$ and $E'_Y$ are referred to as the modified polarization data. As with the ordinary polarization data, $E'_X$ and $E'_Y$ may include an in-phase and a quadrature phase components. That is, $E'_X = E'_{XI} + iE'_{XQ}$ and $E'_Y = E'_{YI} + iE'_{YQ}$.

In some embodiments, the feedback control data comprises digital data. In these and other embodiments, the modified polarization data may be communicated to one or more DACs 326. The DACs 326 may be configured to receive modified polarization data and communicate an analog representation of the modified polarization data to the I-Q modulators 336A and 336B. Specifically, in the transmitter 302A, a first DAC 326A may communicate an analog representation of the quadrature phase component of the modified polarization data for the y polarization component 316 to the y-Q modulator 318D. A second DAC 326B may communicate an analog representation of the in-phase component of the modified polarization data for the y polarization component 316 to the y-I modulator 318C. A third DAC 326C may communicate an analog representation of the in-phase component of the modified polarization data for the x polarization component 314 to the x-I modulator 318A. A fourth DAC 326D may communicate an analog representation of the quadrature phase component of the modified polarization data for the x polarization component 314 to the x-Q modulator 318B. By communicating the modified polarization data to the I-Q modulators 336A and 336B, the electric field of the phase modulators 318 may be altered. Consequently, the SOP of each component of the dual-polarization optical signal 319 may be rotated.

The depiction of the DACs 326 is not meant to be limiting. In alternative embodiments, the transmitter 302A may include a different number of DACs 326, which may communicate modified polarization data to one or more phase modulators 318 without limitation.

Figure 3B:
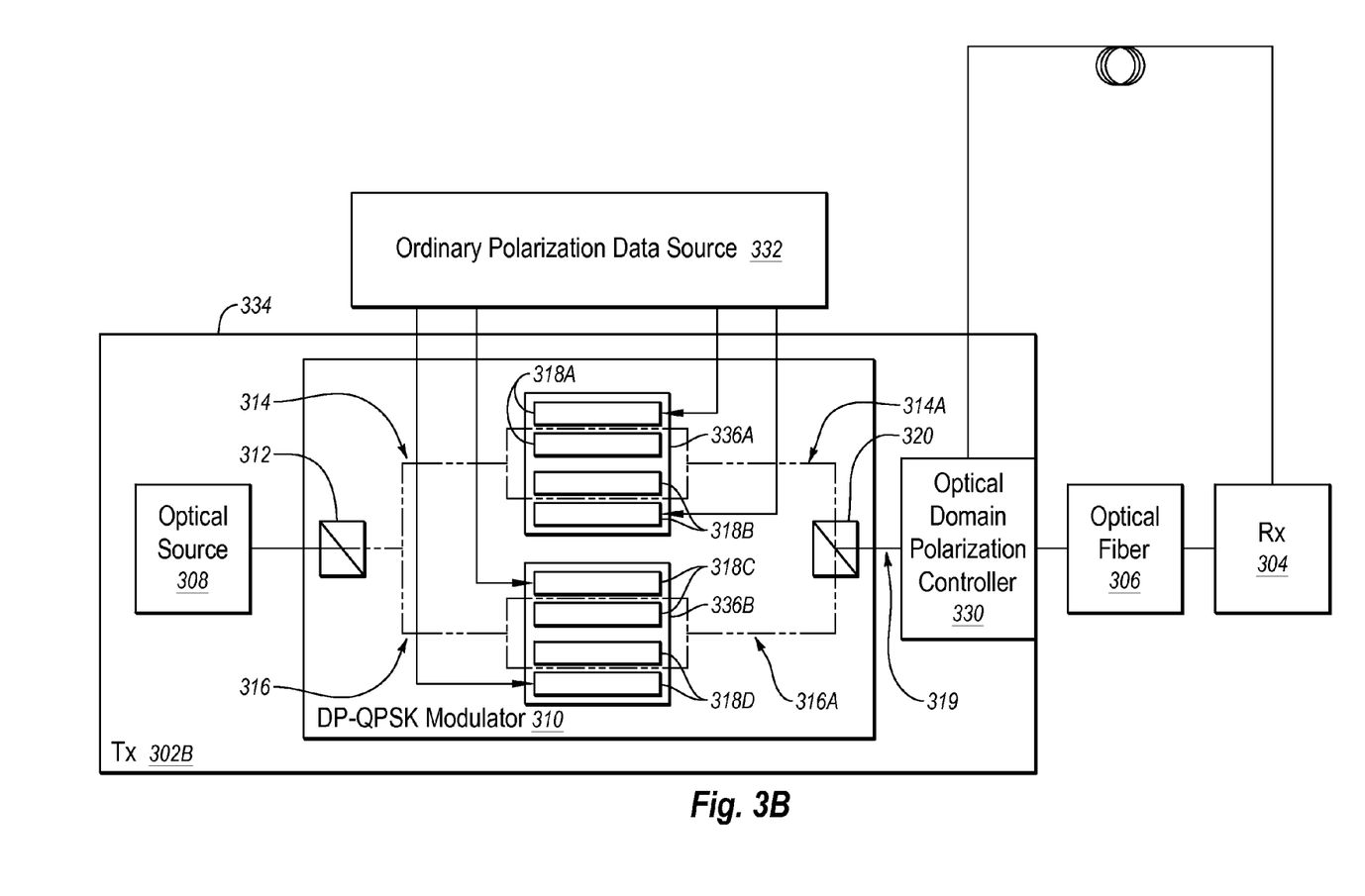
FIG. 3B is a block diagram of another example optical transmitter that may be implemented in the optical network of FIG. 1.

FIG. 3B is a block diagram of another example optical transmitter 302B (hereinafter transmitter 302B) that may be implemented in the optical network 100 of FIG. 1. The transmitter 302B may be similar in many respects to the transmitter 302A of FIG. 3A. Specifically, the optical fiber 306, the receiver 304, the DP-QPSK modulator 310, and the optical source 308 of FIG. 3B correspond to the optical fiber 306, the receiver 304, the DP-QPSK modulator 310, and the optical source 308 of FIG. 3A and each operates as generally described above. However, the DP-QPSK modulator 310 receives ordinary polarization data from an ordinary polarization data source 332. The ordinary polarization data may be communicated to the DP-QPSK modulator 310 to modulate information onto the dual polarization optical signal 319 output from the polarization beam combiner 320.

The transmitter 302B may include an optical domain polarization controller (polarization controller) 330. As depicted in FIG. 3B, the polarization controller 330 may be included physically within a housing 334 of the transmitter 302B. Alternatively, the polarization controller 330 may be positioned external to the housing 334. For example, the polarization controller 330 may be positioned adjacent to the transmitter 302B such that the dual polarization optical signal 319 enters the polarization controller 330 prior to entering the optical fiber 306. In FIG. 3B, the polarization controller 330 is configured to receive the dual polarization optical signal 319 as it exits the DP-QPSK modulator 310. However, in embodiments in which the polarization controller 330 is not included in the transmitter 302B, the polarization controller 330 may receive the dual polarization optical signal 319 as it exits the transmitter 302B.

Additionally, the polarization controller 330 may receive feedback control data from the receiver 304. Based on the feedback control data the polarization controller 330 may modify the SOP of the dual polarization optical signal 319 in the optical domain. An example of the polarization controller 330 may include any system or apparatus configured to rotate the SOP of an optical signal in the optical domain. For example, the polarization controller 330 may include a variable wave plate polarization controller or a "bat ear" polarization controller.

In some embodiments, the polarization controller 330 may include a control unit (not shown). The control unit may receive the feedback control data and control modifications performed by the polarization controller 330. Alternatively, a control unit may be located in the receiver 304, an evaluation module such as the evaluation module 212 of FIG. 2, or another location to control the polarization controller 330.

Figure 4:
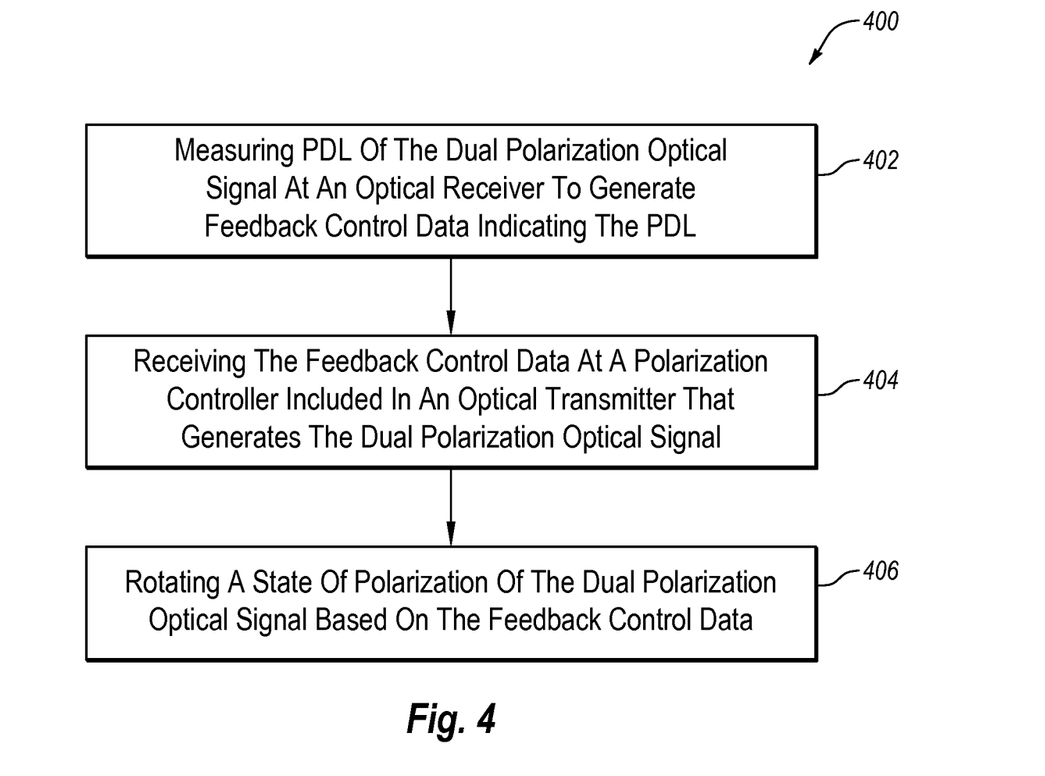
FIG. 4 is a flow diagram of an example method of compensating for polarization dependent loss, arranged in accordance with at least some embodiments described herein.

FIG. 4 is a flow diagram of an example method 400 of compensating for polarization dependent loss (PDL) experienced by a dual polarization optical signal. The method 400 and/or variations thereof may be implemented in the optical network 100 of FIG. 1 and/or may be performed, in whole or in part, by a PDL compensation system such as the PDL compensation system 202 of FIG. 2. More particularly, the method 400 and/or variations thereof may be performed, in whole or in part, by a polarization controller such as any of the polarization controller 216 of FIG. 2, the polarization controller 328 of FIG. 3A, and/or the polarization controller 330 of FIG. 3B. One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The method 400 may begin at block 402 by measuring the PDL of the dual polarization optical signal at an optical receiver to generate feedback control data indicating PDL. Generally, measuring the PDL may be performed by one or more apparatuses that may monitor or otherwise assess an actual BER of the dual polarization optical signal. By measuring the PDL, a system performing the method 400 may determine whether a rotation of the SOP of the dual polarization optical signal may improve signal quality.

Additionally, measuring PDL may include calculating an acceptable OSNR and an expected BER of an optical network or an optical path included therein. When the acceptable OSNR and the expected BER have been calculated, the actual BER may be measured. When the actual BER is greater than the expected BER, an actual OSNR of the dual polarization optical signal may be measured. The actual OSNR may be measured at or near the receiver. The term "near the receiver" may include any location between a final optical or network element in an optical network and the receiver. Thus, the actual OSNR measured is that of the dual polarization optical signal as it is received at the receiver. When the actual OSNR is below the acceptable OSNR, measuring the PDL may include measuring differences in insertion loss of amplified spontaneous emission noise.

Alternatively, measuring PDL may include calculating a Q-factor threshold of an optical path on which the dual polarization optical signal is communicated. After the Q-factor threshold is calculated, the actual BER of the dual polarization optical signal may be measured. The actual BER may be converted to a Q-factor. When the Q-factor of the dual polarization optical signal is less than the Q-factor threshold, measuring the PDL may include monitoring actual OSNR of the dual polarization optical signal.

At block 404, the method 400 may include receiving the feedback control data at a polarization controller included in an optical transmitter that generates the dual polarization optical signal. In some embodiments, the feedback control data may include a control signal, rotational angles, a polarization rotation matrix, or some combination thereof. In some embodiments, the feedback control data may be communicated to an intermediate control unit configured to control the SOP of the dual polarization optical signal.

At 406, the method 400 may include rotating a state of polarization of the dual polarization optical signal based on the feedback control data. In some embodiments, rotating the SOP may include altering an electric field of one or more I-Q modulators, which may be included in a DP-QPSK modulator. Altering the electric field of one or more I-Q modulators may modify the SOP of the dual polarization optical signal. Specifically, the feedback control data may be used to generate modified polarization data upon which the electric field is based. In these and other embodiments, the generation of the modified polarization data may include generation of intermediate polarization data that is linearized and communicated to modulators of the one or more I-Q modulators via one or more DACs.

In alternative embodiments, rotating the SOP may include modifying the SOP of the dual polarization optical signal in an optical domain. When rotating the SOP in the optical domain a control unit may control the rotation. Additionally, rotating in the optical domain may include receiving the dual polarization optical signal transmitted from the transmitter or when the dual polarization optical single exits a modulator with information modulated on the dual polarization optical signal.

In some embodiments, the dual polarization optical signal is a first channel of a multi-channel wavelength division multiplexed (WDM) signal. The multi-channel WDM signal may include a second channel. In these and other embodiments, the method 400 may include measuring the PDL of the second channel at a second optical receiver, communicating second channel feedback control data indicating PDL of the second channel to a second polarization controller at a second optical transmitter; and rotating a SOP of the second channel at a second optical transmitter based on the second channel feedback control data. Similar steps or actions may be performed for each channel included in the multi-channel WDM signal.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. An apparatus configured to be implemented in a multi-channel optical network including a plurality of optical receivers that are optically coupled to one or more of a plurality of optical transmitters and polarization dependent loss (PDL) sources implemented between at least some of the optical transmitters and the optical receivers, the apparatus comprising:

a first evaluation module located at a first optical receiver of the plurality of optical receivers, the first evaluation module configured to:

measure PDL of a first channel of a multi-channel signal received at the first optical receiver which is communicated from a first optical transmitter of the plurality of optical transmitters through a first PDL source of the PDL sources, wherein the measured PDL indicates power reduction of the first channel at least partially caused by the first PDL source, and generate a first polarization rotation matrix based on the PDL measured at the first optical receiver;

a second evaluation module located at a second optical receiver of the plurality of optical receivers, the second evaluation module configured to:

measure PDL of a second channel of the multi-channel signal received at the second optical receiver which is communicated from a second optical transmitter of the plurality of optical transmitters through a second PDL source of the PDL sources, wherein the measured PDL indicates power reduction of the second channel at least partially caused by the second PDL source, and generate a second polarization rotation matrix based on the PDL measured at the second optical receiver;

a first monitor located between the first PDL source and the first evaluation module and configured to measure an actual optical signal-to-noise ratio (OSNR) in the first channel;

a second monitor located between the second PDL source and the second evaluation module and configured to measure an actual OSNR in the second channel;

a first feedback loop that couples the first evaluation module and the first monitor to a first polarization controller, wherein the first polarization controller is included in the first optical transmitter and is configured to receive the first polarization rotation matrix from the first evaluation module and the OSNR from the first monitor via the first feedback loop and in response to a determination that an optical signal quality issue of the first channel is caused by the PDL rather than the OSNR, rotate a state of polarization (SOP) of the first channel at the first optical transmitter based on the first polarization rotation matrix to reduce the PDL caused by the first PDL source in the first channel; and a second feedback loop that couples the second evaluation module and the second monitor to a second polarization controller, wherein the second polarization controller is included in the second optical transmitter and is configured to receive the second polarization rotation matrix from the second evaluation module and the OSNR from the second monitor via the second feedback loop and in response to a determination that an optical signal quality issue of the second channel is caused by the PDL rather than the OSNR, rotate the SOP of the second channel at the second optical transmitter based on the second polarization rotation matrix to reduce the PDL caused by the second PDL source in the second channel.

2. The apparatus of claim 1, wherein the first polarization controller is configured to rotate the SOP by altering an electric field of an in-phase and quadrature-phase (I-Q) modulator configured to encode information on the first channel of the multi-channel signal.

3. The apparatus of claim 2, wherein the polarization rotation matrix comprises rotation angles by which the SOP is to be rotated.

4. The apparatus of claim 1, wherein the first polarization controller comprises:
   a polarization rotator configured to receive the first polarization rotation matrix and ordinary polarization data and to generate intermediate modified polarization data from the ordinary polarization data and the first polarization rotation matrix;
   a linearizer configured to linearize the intermediate modified polarization data to generate modified polarization data; and
   a digital-to-analog converter configured to receive the modified polarization data, generate an analog representation of the received modified polarization data, and communicate the analog representation of the received modified polarization data to an in-phase and quadrature-phase (I-Q) modulator.

5. The apparatus of claim 1, wherein the first polarization controller is configured to modify the SOP of the first channel in the optical domain prior to the first channel entering the optical fiber at the optical transmitter.

6. The apparatus of claim 1, wherein the first evaluation module is further configured to measure an actual bit error rate of the first channel of the multi-channel signal received at the first optical receiver; to convert the actual bit error rate into a Q-factor; and based at least partially on the Q-factor, to determine whether to modify the SOP of the first channel.

7. A system comprising:
   a first optical receivers;
   a first optical transmitter optically coupled to the first optical receiver and configured to communicate a first channel of a multi-channel signal to the first optical receiver through at least a first polarization dependent loss (PDL) source located between the first optical receiver and the first optical transmitter;
   a second optical receiver;
   a second optical transmitter optically coupled to the second optical receiver and configured to communicate a second channel of the multi-channel signal to the second optical receiver through at least a second PDL source located between the second optical receiver and the second optical transmitter;
   a first evaluation module configured to:
      measure PDL of the first channel of the multi-channel signal received at the first optical receiver, wherein the PDL is introduced at least partially the first PDL source, and
      generate a first polarization rotation matrix based on the measured PDL of the first channel of the multi-channel signal;
   a second evaluation module configured to:
      measure PDL of the second channel of the multi-channel signal received at the second optical receiver, wherein the PDL is introduced at least partially by the second PDL source, and
      generate a second polarization rotation matrix based on the measured PDL of the second channel of the multi-channel signal;
   a first feedback loop included in an optical fiber that couples the first evaluation module to the first optical transmitter,
   wherein the first optical transmitter includes:
      a first optical source configured to generate a first continuous wave (CW) optical signal,
      a first modulator configured to modulate the first CW optical signal to generate the first channel of the multi-channel signal, and
      a first polarization controller configured to rotate a state of polarization (SOP) of the first channel of the multi-channel signal at the first optical transmitter based on the first polarization rotation matrix received from the first evaluation module via the first feedback loop to reduce the PDL caused by the first PDL source in the first channel; and
   a second feedback loop included in the optical fiber, wherein the second feedback loop communicatively couples the second evaluation module to the second optical transmitter,
   wherein the second optical transmitter includes:
      a second optical source configured to generate a second CW optical signal,
      a second modulator configured to modulate the second CW optical signal to generate the second channel of the multi-channel signal, and
      a second polarization controller configured to rotate an SOP of the second channel of the multi-channel signal at the second optical transmitter based on the second polarization rotation matrix received from the second evaluation module via the second feedback loop to reduce the PDL caused by the second PDL source in the second channel.

8. The system of claim 7, wherein the first modulator comprises an in-phase and quadrature-phase (I-Q) modulator, and wherein the first polarization controller is further configured to generate modified polarization data from the polarization rotation matrix that affects the electrical field of the I-Q modulator so as to cause the SOP of the first channel of the multi-channel signal to rotate.

9. The system of claim 7, wherein the system operates at bit rates of about 40 gigabits per second (Gb/s), 100 Gb/s, 400 Gb/s or higher.

10. The system of claim 7, wherein the first polarization controller is configured to modify the SOP in the optical domain.

11. The system of claim 7, further comprising a first monitor configured to measure an actual OSNR in response to the first evaluation module measuring an actual bit error rate of the first channel of the multi-channel signal that is greater than an expected bit error rate or in response to the Q-factor of the first channel of the multi-channel signal being below a Q-factor threshold.

12. The system of claim 11, wherein the first monitor is configured to measure the first channel of the multi-channel signal directly prior to the first channel of the multi-channel signal being received at the first evaluation module.

13. A method of compensating for polarization dependent loss (PDL) experienced by a first channel and a second channel of a multi-channel signal, the method comprising:
measuring PDL of the first channel of the multi-channel signal received at a first optical receiver based on optical power of the first channel of the multi-channel signal, the measured PDL indicating PDL of the first channel at least partially caused by a first PDL source located between the first optical receiver and a first optical transmitter that generated the first channel of the multi-channel signal;
measuring PDL of the second channel of the multi-channel signal received at a second optical receiver based on optical power of the second channel of the multi-channel signal, the measured PDL indicating PDL of the second channel at least partially caused by a second PDL source located between the second optical receiver and a second optical transmitter that generated the second channel of the multi-channel signal;
generating a first feedback control data including a first polarization rotation matrix based on the measured PDL of the first channel;
generating a second feedback control data including a second polarization rotation matrix based on the measured PDL of the second channel;
communicating the first feedback control data to a first polarization controller included in the first optical transmitter via a first feedback loop included in an optical fiber optically coupling the first optical receiver to the first optical transmitter and the second optical receiver to the second optical transmitter;
communicating the second feedback control data to a second polarization controller included in the second optical transmitter;
receiving the first feedback control data at the first polarization controller;
receiving the second feedback control data at the second polarization controller;
rotating a state of polarization (SOP) of the first channel of the multi-channel signal at the first optical transmitter based on the first feedback control data to at least partially compensate for the PDL caused by the first PDL source; and
rotating an SOP of the second channel of the multi-channel signal at the second optical transmitter based on the second feedback control data to at least partially compensate for the PDL caused by the second PDL source.

14. The method of claim 13, wherein rotating the SOP of the first channel of the multi-channel signal based on the feedback control data comprises:
altering an electrical field of one or more in-phase and quadrature-phase (I-Q) modulators to modify the SOP of the first channel of the multi-channel signal; or
modifying the SOP of the first channel of the multi-channel signal in an optical domain at the first optical transmitter.

15. The method of claim 13, further comprising:
calculating an acceptable OSNR of an optical path between the first optical receiver and the first optical transmitter;
measuring an actual bit error rate of the first channel of the multi-channel signal; and
in response to the actual bit error rate being greater than an expected bit error rate,
measuring, by the monitor, differences in insertion loss of amplified spontaneous emission noise.

16. The method of claim 13, wherein measuring the PDL of the first channel of the multi-channel signal comprises:
calculating a Q-factor threshold of an optical path between the first optical receiver and the first optical transmitter;
measuring an actual bit error rate of the first channel of the multi-channel signal;
converting the bit error rate to a Q-factor; and
when the Q-factor of the first channel of the multi-channel signal is less than the Q-factor threshold, measuring the actual optical signal-to-noise ratio (OSNR) of the first channel of the multi-channel signal.

17. The apparatus of claim 4, wherein:
the ordinary polarization data is described by equations:

$$E_X = E_{XI} + iE_{XQ}, \text{ and}$$

$$E_Y = E_{YI} + iE_{YQ};$$

the first polarization rotation matrix is described by equation:

$$R(\theta, \psi) = \begin{bmatrix} \cos\left(\frac{\theta}{2}\right) + i\sin\left(\frac{\theta}{2}\right)\cos(2\psi) & i\sin\left(\frac{\theta}{2}\right)\sin(2\psi) \\ i\sin\left(\frac{\theta}{2}\right)\sin(2\psi) & \cos\left(\frac{\theta}{2}\right) - i\sin\left(\frac{\theta}{2}\right)\cos(2\psi) \end{bmatrix};$$

the intermediate modified polarization data is described by equation:

$$\begin{bmatrix} E''_X \\ E''_Y \end{bmatrix} = R(\theta, \psi) \begin{bmatrix} E_X \\ E_Y \end{bmatrix}; \text{ and}$$

the intermediate polarization data is linearized according to equations:

$$E'_X = \frac{2}{\pi}\sin^{-1}(E''_X), \text{ and}$$

$$E'_X = \frac{2}{\pi}\sin^{-1}(E''_Y);$$

wherein
$E_X$ represents ordinary polarization data for an x polarization component in an electrical domain;
$E_{XI}$ represents the in-phase of $E_X$;
$E_{XQ}$ represents the quadrature phase of $E_X$;
$E_Y$ represents ordinary polarization data for a y polarization component in the electrical domain;
$E_{YI}$ represents the in-phase of $E_Y$;
$E_{YQ}$ represents the quadrature phase of $E_Y$;
$\theta$ and $\psi$ represent rotation angles;
$E''_X$ represents intermediate modified polarization data for the x polarization component;
$E''_Y$ represents intermediate modified polarization data for the y polarization component;
$E'_X$ represents modified polarization data for the x polarization component; and
$E'_Y$ represents the modified polarization data for the y polarization component.

* * * * *